United States Patent [19]
Kawabata et al.

[11] Patent Number: 6,127,511
[45] Date of Patent: Oct. 3, 2000

[54] PREPARATION PROCESS OF PHENOL ARALKYL RESINS

[75] Inventors: Tomoyuki Kawabata; Yuzo Ono; Teruo Yuasa; Yukio Fukui, all of Aichi-ken, Japan

[73] Assignee: Mitsui Chemicals, Inc., Japan

[21] Appl. No.: 09/204,552

[22] Filed: Dec. 3, 1998

[30] Foreign Application Priority Data

Dec. 11, 1997 [JP] Japan .................................. 9-341191

[51] Int. Cl.⁷ .................................................. C08G 65/38
[52] U.S. Cl. ........................ 528/212; 528/205; 528/503; 568/626; 568/628; 568/715; 261/128; 210/150
[58] Field of Search ..................................... 528/212, 205, 528/503; 568/626, 628, 715; 261/128; 210/150

[56] References Cited

U.S. PATENT DOCUMENTS 5,618,984  4/1997  Kowabata et al. ........................ 569/720

FOREIGN PATENT DOCUMENTS

| | | |
|---|---|---|
| 57-26606 | 6/1982 | Japan . |
| 6-100667 | 4/1994 | Japan . |
| 7-236801 | 9/1995 | Japan . |
| 7-304806 | 11/1995 | Japan . |

*Primary Examiner*—Duc Truong
*Attorney, Agent, or Firm*—Burns, Doane, Swecker, & Mathis, L.L.P.

[57] ABSTRACT

A preparation process of phenol aralkyl resin from phenol compound and aralkyl compound by controlling the temperature of reaction mass in the range of 70 to 240° C. and simultaneously controlling the temperature of vapor phase potion and vapor-liquid interface portion of manufacturing equipment so as to keep the wall surface of the vapor phase portion and vapor-liquid interface portion in a wet state. The invention can prevent scale adhesion to the interior of manufacturing equipment, remarkably reduce the number of washing and scale removing procedures on the manufacturing equipment, and enable efficient manufacture of phenol aralkyl resin. When the phenol aralkyl resin obtained is used for a molding material, molded articles having excellent heat resistance and high reliability can be provided.

8 Claims, No Drawings

PREPARATION PROCESS OF PHENOL ARALKYL RESINS

BACKGROUND OF THE INVENTION AND RELATED ART

1. Field of the Invention

The present invention relates to a preparation process of phenol aralkyl resins, and more particularly, the invention relates to a method for preventing adhesion of scale to the internal surface of manufacturing equipment in the manufacture of phenol aralkyl resins.

2. Related Art of the Invention

It has been known that a solvent-insoluble polymer adheres to the interior of a reactor in the manufacture of various synthetic resins. The adhered polymer is called scale, cullet or built up. Adhesion of scale to the internal wall of a reactor and the stirring blades impairs heat conduction of the reactor and. reduces effectiveness of heat exchange of the reactor. Further, when the adhered scale peels off and contaminates the resin product, the quality of the product is extremely impaired and moreover, possibility of blocking is developed in the various pipe arrangements which connect with the reactor.

Japanese Laid-Open Patent HEI 7-304806 has disclosed in the preparation of a vinyl chloride based polymer, a preparation process which can prevent adhesion of the polymer scale to the reactor by adding an initiator to the charged mixture and successively maintaining the temperature of the heating medium which runs through the jacket in a range between temperature of the charged mixture and temperature of preset polymerization temperature +4° C. or less.

As to preparation of phenols, Japanese Laid-Open Patent HEI 7-236801 has disclosed a technique for giving mechanical vibration and thus preventing scale adhesion to a heat transfer tube mounted on the interior of a still. As to phenol resin, Japanese Patent Publication SHO 57-26606 has disclosed preparation equipment of phenol resin which can cool the upper portion of an evaporator and the connecting pipe between the evaporator and a mist separator. Scale adhesion to the internal surface of the connecting pipe can be inhibited by cooling the connecting pipe.

As to preparation process of phenol aralkyl resins, Japanese Laid-Open Patent HEI 6-100667 has disclosed a preparation process of a high purity phenol polymer by reacting a phenol compound in the absence of a catalyst with an aromatic compound represented by the general formula;

R—(CH$_2$X)$_2$ wherein R is a phenylene group, alkyl substituted phenylene group, biphenylene group, divalent diphenyl ether group or naphthylene group, and X is a halogen atom.

The preparation process is characterized ir that a phenol polymer is prepared by condensation of an aromatic compound with a phenol compound without using a catalyst. The phenol polymer obtained by the process is a high-purity excellent polymer and does not contain acid constituent or metallic ingredient. However, no disclosure is found in the patent on the method for preventing scale adhesion to the interior of manufacturing equipment.

At present, mechanical clearance is generally carried out on the scale of phenol resin, phenol aralkyl resin in particular, which adheres to the interior of manufacturing equipment. Mechanical clearance cannot completely remove the scale, and additionally, has the risk of troubles for causing breakage of the equipment and the problems of decrease in the operating efficiency of the equipment due to peeling operation.

In view of the above problems, the object of the invention is to provide a preparation process of phenol aralkyl resin which can prevent scale adhesion to the interior of manufacturing equipment.

SUMMARY OF THE INVENTION

As a result of an intensive investigation in order to solve the above subjects, the present inventors have found that the above subjects can be solved by controlling the temperature of a vapor phase portion and a vapor-liquid interface portion so as to keep the wall surface of the vapor phase portion and the vapor-liquid interface portion of the manufacturing equipment in a wet state. Thus, the present invention has been completed.

That is, one aspect of the present invention is a preparation process of phenol aralkyl resins comprising controlling the temperature of a reaction mass at 70° C. to 240° C. and simultaneously controlling the temperature of the vapor phase portion and the vapor-liquid interface portion so as to keep the wall surface of the vapor phase portion and the vapor-liquid interface portion of the manufacturing equipment in a wet state.

In the invention, in order to keep the wall surface of the vapor phase portion and the vapor-liquid interface portion in the wet state, the temperature at outer wall surface of the vapor phase portion and the vapor-liquid interface portion in the manufacturing equipment is preferably controlled to a temperature 5 to 90° C. lower than the temperature of the reaction mass.

On the practice of the above method in the invention, manufacturing equipment having a jacket which is divided into the upper and lower sections is used, and the temperature of the reaction mass is preferably controlled by the lower jacket and the outer wall surface temperature of the vapor phase portion and the vapor-liquid interface portion is preferably controlled by the upper jacket. And, the liquid depth of the heating medium in the lower jacket is preferably controlled so as to have a ratio of 0.3 to 1 for the liquid depth of the reaction mass. Further, the vapor phase portion in the manufacturing equipment is preferably substituted or ventilated by an inert gas.

The invention prevents adhesion of scale to the interior of the manufacturing equipment, remarkably decrease, the number of operations for washing the manufacturing equipment and peeling the scale, and enables efficient production of phenol aralkyl resins. Further, when the phenol aralkyl resins obtained by the invention are used for molding and other processing materials, formed articles having excellent thermal resistance and high reliability can be obtained.

DETAILED DESCRIPTION OF PREFERRED EMBODIMENTS

The present invention will hereinafter be illustrated in detail.

The term "manufacturing equipment" in the invention refers to the reactor at least equipped with a stirrer and a temperature sensor. A baffle, sensor for temperature control, manhole for sampling and inlet tube of inert gas can be furnished depending upon the capacity of the reactor. Further, a flush valve for discharge and other arrangements can be provided in view of workability.

The outline of the process for preparing the phenol aralkyl resin will be shown below. That is, a reaction mass is prepared by mixing 1 mole of a phenol compound with 0.2 to 1 mole, preferably 0.25 to 0.9 mole of an aralkyl compound. The reaction is carried out in the presence or absence of a catalyst. The temperature of the reaction mass is maintained in the range of 70 to 240° C. After finishing the reaction, the unreacted phenol compound is distilled off under reduced pressure to obtain the phenol aralkyl resin.

Any compounds having a phenolic hydroxyl group can be used as a phenol compound for a raw material of the invention. Representative phenol compounds include, for example, phenol; o-cresol, m-cresol, p-cresol, xylenol, p-tert-butylphenol and other alkyl substituted phenols; p-phenylphenol and other aromatic substituted phenols; catechol, resorcinol and other divalent phenols; and α-naphthol, β-naphthol and other naphthol compounds. These phenol compounds can be used singly or as a mixture. Preferred compounds are phenol, p-cresol, xylenol, p-tert-butylphenol, p-phenylphenol, catechol, resorcinol and naphthol. Phenol is more preferred.

The aralkyl compounds which can be used as a raw material in the invention are aromatic compounds having a divalent halomethyl group, hydroxymethyl group, alkoxymethyl group and other groups capable of condensation addition. Exemplary aralkyl compounds include, for example, 1,4-bis(chloromethyl)benzene, 1,3-bis(chloromethyl) benzene, 1,2-bis(chloromethyl)benzene, bis(chloromethyl) biphenyl and other bis(halomethyl)aromatic compounds; 1,4-bis(hydroxymethyl)benzene, 1,3-bis(hydroxymethyl) benzene, 1,2-bis(hydroxymethyl)benzene and other bis (hydroxymethyl)aromatic compounds; and 1,4-bis (methoxymethyl)benzene, 1,4-bis(ethoxymethyl)benzene, 1,3-bis(methoxymethyl)benzene, 1,3-bis(ethoxymethyl) benzene, bis(methoxymethyl)biphenyl and other bis (alkoxymethyl)aromatic compounds. Preferred compounds are 1,4-bis(chloromethyl)benzene and 1,4-bis (methoxymethyl)benzene.

A catalyst can be used in the reaction of the phenol compound with the aralkyl compound. Exemplary catalysts include, for example, stannic chloride, zinc chloride, ferric chloride, cupric chloride, cupric sulfate, mercurous sulfate, mercuric sulfate, mercurous chloride, mercuric chloride, silver sulfate, silver chloride, sodium hydrogen sulfate and other inorganic compounds; sulfuric acid, monoethyl sulfate, dimethyl sulfate, diethyl sulfate and other sulfuric acid compounds; and p-toluenesulfonic acid, p-phenolsulfonic acid, methanesulfonic acid and other organic sulfonic acids. These catalysts can be used singly or as a mixture. The amount of the catalyst is usually 0.01 to 5% by weight for the total weight of the phenol compound and aralkyl compound.

Some species of the aralkyl compound do not require a catalyst. For example, bis(halomethyl)aromatic compounds can progress the reaction in the absence of a catalyst so long as the reaction temperature is in the below described range.

On carrying out the above reaction, organic solvents can be used, when necessary. Exemplary solvents which can be used include, for example, methanol, ethanol, n-propanol, isopropanol, n-butanol, tert-butanol and other alcohol compounds; toluene, xylene, mesitylene and other aromatic compounds; and chlorobenzene, nitrobenzene and other substituted aromatic compounds.

The reaction temperature is usually in the range of 70 to 240° C. When the temperature is lower than 70° C., the reaction rate extremely decreases. Suitable reaction temperature depends also upon the combination of an aralkyl compound and phenol compound. For example, when the aralkyl compound is a bis(halomethyl)aromatic compound, the reaction temperature is desirably in the range of 70 to 200° C. When the aralkyl compound is a bis(alkoxymethyl) aromatic compound, the reaction temperature is desirably in the range of 130 to 240° C. The reaction time is usually 1 to 20 hours.

The desired phenol aralkyl resin can be obtained in good yield by the above reaction steps. However, in order to achieve the object of the invention, that is, to prevent adhesion of scale to the internal wall of the manufacturing equipment, the temperature of the vapor phase portion and vapor-liquid interface portion in the manufacturing equipment must be controlled so as to keep the wall surface of these portions in a wet state.

The term "wet state" refers to a state wherein a phenol compound and a mixture of the phenol compound and the organic solvent exist in a liquid state almost over the whole surface of the wall of a vapor phase portion and vapor-liquid interface portion of the manufacturing equipment. Such a state can be resulted, for example, from condensed liquid of phenol compound and organic solvent in the vapor phase portion and the vapor-liquid interface portion due to vapor-liquid equilibrium in the reactor, or from refluxed liquid of phenol compound and organic solvent from a heat exchanger.

In the preparation of phenol aralkyl resin in the experimental scale, the preparation equipment is usually washed for each preparation batch and thus adhesion of scale to the interior of the reactor leads to almost no problems. However, a manufacturing equipment in industry preferably repeats manufacture in view of economy without washing the equipment after discharging the resin product, and thus prevention of scale adhesion is important.

In order to keep the wet state on the wall surface of the vapor phase portion and the vapor-liquid interface portion in the manufacturing equipment, the temperature of the outer wall surface in the vapor phase portion and the vapor-liquid interface portion is controlled to temperature lower than the temperature of the reaction mass, preferably to 5 to 90° C. lower temperature in view of ease control.

Particularly when the temperature is controlled to more than 90° C. lower than the temperature of the reaction mass, a glass-lined manufacturing equipment which can be suitably used for production of the phenol aralkyl resin is liable to be broken.

Control is carried out, for example, by using manufacturing equipment having a jacket which is divided into upper and lower sections, controlling the temperature of the reaction mass with lower jacket, and independently controlling with the upper jacket the outer wall surface temperature of the vapor phase portion and the vapor-liquid interface portion in the manufacturing equipment.

In order to control the outer wall surface temperature of the vapor phase portion and the vapor-liquid interface portion in the manufacturing equipment to the above condition, a heating medium is preferably circulated in the upper jacket at 65 to 150° C. which is 5 to 90° C. lower than the temperature of the reaction mass.

The temperature of the reaction mass is controlled by circulating a heating medium in the lower jacket. In view of prevention of scale adhesion to the interior of the manufacturing equipment and good temperature control for the reaction mass, liquid depth of the heating medium in the lower jacket is preferably equal to or lower than the liquid depth of the reaction mass in the manufacturing equipment. Specifically, the ratio of the liquid depth of the heating medium in the lower jacket to the liquid depth of the reaction mass is preferably controlled to 0.3 to 1.

The term "liquid depth of the reaction mass" refers to the height from the bottom of the reactor to the top of the reaction mass. Similarly, the term "liquid depth of the heating medium" in the lower jacket refers to the height from the bottom to the top portion of the heating medium which circulates in the jacket installed on the outside of the reactor. That is, in the invention, the top portion of the heating medium in the lower jacket is controlled so as to hold a position lower in the above range than the top portion of the reaction mass. No particular restriction is imposed upon the position of the upper jacket which controls the outside wall surface temperature of the vapor phase portion and the vapor-liquid interface portion in the manufacturing equipment. The upper jacket is installed adjacent to the top portion of the lower jacket above and preferably installed on the outside of the outer wall surface of overall vapor-liquid interface portion and overall or part of the vapor phase portion in the manufacturing equipment.

Heating medium which can be used is an oil bath or hot water bath in a laboratory stage, and steam or silicon oil as in-jacket fluids in the manufacturing equipment in industry. However, no restriction is imposed upon these media so long as temperature of the media can be controlled. Further, the lower jacket is replaced by an external circulation type heating unit which is installed on the outside of the reactor system and the temperature of the reaction mass can be controlled.

Further in the invention, it is effective for preventing scale adhesion to reduce oxygen concentration in the vapor phase portion by introducing an inert gas into the vapor phase portion in the manufacturing equipment. The inert gas includes nitrogen, helium and argon. Nitrogen is preferred in view of industry and economy.

Oxygen concentration in the vapor phase portion is preferably 2% by volume or less, more preferably 0.5% by volume or less.

Usually, below described two processes can be exemplified for preparing the phenol aralkyl resins. The first process is to react bis(halomethyl)aromatic compound with phenol compound in the presence or absence of a catalyst, at the prescribed temperature, while gradually removing hydrogen halogenide by-product. The second process is, in the first step, to react bis(halomethyl)aromatic compound with alcohol or water in the presence of a basic compound. Bis (alkoxymethyl)aromatic compound or bis(hydroxymethyl)-aromatic compound thus obtained is successively reacted with phenol compound in the presence of a catalyst, at the prescribed temperature, while removing alcohol or water by-product from the reaction system. In any processes, excess phenol compound is removed after finishing the reaction from the reaction system under reduced pressure. The preparation process of the phenol aralkyl resin in the invention can be applied to any preparation processes described above.

The invention can prevent scale adhesion to the interior of the manufacturing equipment, remarkably reduce the number of washing and scale removing procedures on the manufacturing equipment, and enable efficient manufacture of phenol aralkyl resin.

Further, when the phenyl aralkyl resin obtained is used for a molding material, molded articles having excellent heat resistance and high reliability can be provided.

EXAMPLE

The invention will hereinafter be illustrated further in detail by way of examples.

Example 1

To a 2000 ml separable flask equipped with a condenser, stirrer and temperature sensor, 941 g (10.0 moles) of phenol and 875 g (5.0 moles) of 1,4-bis(chloromethyl)benzene (hereinafter referred to simply as PXDC) were charged and heated with stirring in an oil bath. At the point in time, the distance from the bottom surface of the separable flask to the top portion of the reaction mass (hereinafter referred to as liquid depth of the reaction mass) was 131 mm. The reaction was carried out at 90° C. for 8 hours and an aging reaction was successively carried out at 150° C. for 90 minutes. Thereafter, unreacted phenol was distilled off under reduced pressure to obtain 1108 g of phenol aralkyl resin. At the point in time, the liquid depth of the reaction mass was 74 mm.

During the reaction and aging, the distance, from the bottom surface of the separable flask to the top surface of the heating oil in the oil bath (hereinafter referred to as liquid depth of the heating medium) was always controlled to 65 mm. The outside wall surface temperature of the vapor phase portion and vapor-liquid interface portion was 60° C.

The separable flask used for the reaction was not washed, and continuously used as intact for the next four batches of similar procedures. Adhesion of scale was not found at all.

Example 2

To a 2000 ml separable flask equipped with a condenser, stirrer and temperature sensor, 941 g (10.0 moles) of phenol and 875 g (5.0 moles) of PXDC were charged and heated with stirring in an oil bath. At the point in time, the liquid depth of reaction mass was 131 mm. The reaction was carried out at 130° C. for 4 hours and the aging reaction was successively carried out at 150° C. for 90 minutes. Thereafter, unreacted phenol was distilled off under reduced pressure to obtain 1104 g of phenol aralkyl resin. At the point in time, the liquid depth of reaction mass was about 74 mm.

During the reaction and aging, the oil bath was always set so as to make the liquid depth of the heating medium 65 mm. The outside wall surface temperature of the vapor phase portion and vapor-liquid interface portion was 110° C.

The separable flask used for the reaction was not washed, and continuously used as intact for the next 9 batches of similar procedures. Adhesion of scale was not found at all.

Example 3

To a 2000 ml separable flask equipped with a condenser, stirrer, nitrogen inlet tube and temperature sensor, 941 g, (10.0 moles) of phenol and 875 g (5.0 moles) of PXDC were charged and heated with stirring in an oil bath. At the point in time, the liquid depth of reaction mass was 131 mm. The reaction was carried out at 160° C. for 3 hours. Thereafter, unreacted phenol was removed under reduced pressure to obtain 1106 g of phenol aralkyl resin. At the point in time, the liquid depth of reaction mass was about 74 mm.

During the reaction, the position of the oil bath was controlled so as to always maintain the liquid depth of the reaction mass equal to the liquid depth of the heating medium. The outside wall surface temperature of the vapor phase portion and vapor-liquid interface portion was 150° C.

The separable flask used for the reaction was not washed, and continuously used as intact for the next 9 batches of similar procedures. A very small amount of scale was observed. However, the amount was so small that the weight difference of the separable flask could not be detected between before and after manufacturing procedures.

Example 4

To a 2000 ml separable flask equipped with a condenser, stirrer, nitrogen inlet tube and temperature sensor, 941 g (10.0 moles) of phenol and 875 g (5.0 moles) of PXDC were charged, oxygen concentration of the vapor phase portion was reduce to 0.5% by volume by ventilating nitrogen gas, and the mixture was heated with stirring in an oil bath. At the point in time, the liquid depth of reaction mass was 131 mm. The reaction was carried out at 160° C. for 3 hours. Ventilation of nitrogen gas was stopped and unreacted phenol was distilled off under reduced pressure to obtain 1105 g of phenol aralkyl resin. At the point in time, the liquid depth of reaction mass was about 74 mm.

During the reaction, the position of the oil bath was always controlled so as to obtain equal liquid depth between the reaction mass and the heating medium. The outside wall surface temperature of the vapor phase portion and vapor-liquid interface portion was 150° C.

The separable flask used for the reaction was not washed, and continuously used as intact for the next 9 batches of similar procedures. No adhesion of scale was found.

Example 5

To a 2000 ml separable flask equipped with a condenser, stirrer and temperature sensor, 861 g (9.15 moles) of phenol and 30.0 g of methanol and 0.889 g of diethyl sulfate was charged and heated with stirring in an oil bath. At the point in time, the liquid depth of reaction mass was 70 mm. When the temperature of the reaction mass reached to 140° C., 1,4-bis(methoxymethyl)benzene (hereinafter referred to simply as PXDM) was initiated to charge. After continuously adding 831 g (5.00 moles) of PXDM over 4 hours, aging of the reaction mass was carried out at 150° C. for 90 minutes. Methanol was distilled off by heating the reaction mass to 160° C. and unreacted phenol was successively removed under reduced pressure to obtain 1013 g of phenol aralkyl resin. At the point in time, the liquid depth of reaction mass was about 67 mm.

During the reaction, the position of the oil bath was always controlled so as to make the liquid depth of the heating medium 60 mm. The outside wall surface temperature of the vapor phase portion and vapor-liquid interface portion was 130° C.

The separable flask used for the reaction was not washed, and continuously used as intact for the next 4 batches of similar procedures. Adhesion of scale was not observed.

Example 6

The manufacturing equipment used had a jacket which was vertically divided into two sections, that is, 0 to 435 mm was the lower section of jacket and 435 to 830 mm was the upper section of jacket respectively on the basis of the reactor bottom.

To the 300 liter manufacturing equipment equipped with a jacket above, condenser, stirrer, baffle, nitrogen inlet tube and temperature sensor, 141.2 kg (1.50 kmoles) of phenol was charged, oxygen concentration was reduced to 2% by volume by ventilating nitrogen into the vapor phase portion, steam of 175 kg/cm$^2$G was introduced into the lower section of the jacket, and the temperature was raised with stirring. At the point in time, the distance from the bottom of the reactor to the top of the reaction mass (hereinafter referred to as liquid depth of reaction mass) was 470 mm. After temperature of the reaction mass reached to 130° C., 131 kg (0.75 kmoles) of PXDC was gradually charged and reacted for 4 hours. During the reaction time, steam of 0.11 to 0.46 kg/cm$^2$G was introduced into the upper section of the jacket and thus the outside wall surface temperature of the vapor phase portion and vapor-liquid interface portion was maintained at 100 to 110° C.

In the next step, the temperature of the reaction mass was raised to 160° C., aging reaction was carried out for 90 minutes, successively ventilation of nitrogen was stopped, and unreacted phenol was removed under reduced pressure to obtain 166 kg of phenol aralkyl resin. At the point in time, the liquid depth of the reaction mass was 500 mm. During aging and post treatment, steam of 0.46 to 1.02 kg/cm$^2$G was introduced into the upper section of the jacket to maintain the outside wall surface temperature of the vapor phase portion and vapor-liquid interface portion at 110 to 120° C.

The manufacturing equipment used was not washed and continuously used as intact for the next 14 batches of similar procedures. No adhesion of scale was observed.

Example 7

The manufacturing equipment used had a jacket which was vertically divided into three sections, that is, 0 to 500 mm was the lower section of the jacket, 500 to 920 mm was the middle section of the jacket, and 920 to 1340 mm was the upper section of the jacket, respectively, on the basis of the reactor bottom.

To the 1 m$^3$ manufacturing equipment equipped with a jacket above, condenser, stirrer, baffle, nitrogen inlet tube and temperature sensor, 462.3 kg (4.92 kmoles) of phenol was charged, oxygen concentration was reduced to 2% by volume by ventilating nitrogen into the vapor phase portion, steam of 1.75 kg/cm$^2$G was introduced into the lower section of the jacket, and the temperature was raised with stirring. At the point in time, the liquid depth of reaction mass was 750 mm. After temperature of the reaction mass reached to 130° C., 430 kg (2.46 kmoles) of PXDC was gradually charged and reacted for 4 hours. During the reaction time, steam of 0.11 to 0.46 kg/cm$^2$G was introduced into the upper section of the jacket to maintain the outside wall surface temperature of the vapor phase portion and vapor-liquid interface portion at 100 to 110° C.

In the next step, the temperature of the reaction mass was raised to 160° C., aging reaction was carried out for 90 minutes, successively ventilation of nitrogen was stopped, and unreacted phenol was removed under reduced pressure to obtain 555 kg of phenol aralkyl resin. At the point in time, the liquid depth of the reaction mass was 770 mm. During aging and post treatment, steam of 0.46 to 1.02 kg/cm$^2$G was introduced into the upper and middle sections of the jacket to maintain the outside wall surface temperature of the vapor phase portion and vapor-liquid interface portion at 110 to 120° C.

The manufacturing equipment used was not washed and continuously used as intact for the next 7 batches of similar procedures. No adhesion of scale was observed.

Example 8

To a 2000 ml separable flask equipped with a condenser, stirrer and temperature sensor, 941 g (10.0 moles) of phenol and 875 g (5.0 moles) of PXDC were charged and heated with stirring in an oil bath. At the point in time, liquid depth of the reaction mass was 131 mm. The reaction was carried out at 90° C. for 10 hours and the aging reaction was carried out at 150° C. for 90 minutes. The unreacted phenol was removed under reduced pressure to obtain 1105 g of phenol aralkyl resin. At the point in time, the liquid depth was about 74 mm.

During the reaction and post treatment, the position of the oil bath was always set so as to make the liquid depth of heating medium 40 mm. The outside wall surface temperature of the vapor phase portion and vapor-liquid interface portion was 60° C.

The separable flask used for the reaction was not washed, and continuously used as intact for the next 4 batches of similar procedures. No adhesion of scale was generated.

Example 9

To a 2000 ml separable flask equipped with a condenser, stirrer and temperature sensor, 922 g (9.8 moles) of phenol and 879 g (3.5 moles) of bis(chloromethyl)biphenyl (hereinafter referred to simply as BCBP) were charged and heated with stirring in an oil bath. At the point in time, the liquid depth of the reaction mass had 129 mm. The reaction was carried out at 110° C. for 8 hours and the aging reaction was carried out at 150° C. for 90 minutes. Successively, the unreacted phenol was removed under reduced pressure to obtain 1148 g of phenol aralkyl resin. At the point in time, the liquid depth of the reaction mass had about 83 mm.

During the reaction and post treatment, the position of the oil bath was always controlled so as to make the liquid depth of heating medium 52 mm. The outside wall surface temperature of the vapor phase portion and vapor-liquid interface portion was 60° C.

The separable flask used for the reaction was not washed, and continuously used as intact for the next 4 batches of similar procedures. As a result, no adhesion of scale was observed.

Comparative Example 1

To a 2000 ml separable flask equipped with a condenser, stirrer and temperature sensor, 941 g (10.0 moles) of phenol and 875 g (5.0 moles) of PXDC were charged and heated with stirring in an oil bath. At the point in time, the liquid depth of the reaction mass was 131 mm. The reaction was carried out at 160° C. for 3 hours and successively the unreacted phenol was removed under reduced pressure to obtain 1111 g of phenol aralkyl resin. At the point in time, the liquid depth of the reaction mass was about 74 mm.

During the reaction and post treatment, the position of the oil bath was always controlled so as to make the liquid depth of heating medium 145 mm. The outside wall surface temperature of the vapor phase portion and vapor-liquid interface portion was 160° C.

The separable flask used for the reaction was not washed, and continuously used as intact for next one batch of similar procedures. As a result, 0.52 g of scale was adhered.

Comparative Example 2

To a 2000 ml separable flask equipped with a condenser, stirrer, nitrogen inlet tube and temperature sensor, 941 g (10.0 moles) of phenol and 875 g (5.0 moles) of PXDC were charged, oxygen concentration was reduced to 0.5% by volume by ventilating nitrogen into the vapor phase portion, and the reaction mass was heated with stirring in an oil bath. At the point in time, the liquid depth of the reaction mass was 131 mm. The reaction was carried out at 160° C. for 3 hours. Unreacted phenol was successively removed under reduced pressure to obtain 1111 g of phenol aralkyl resin. At the point in time, the liquid depth of the reaction mass was 74 mm.

During the reaction and post treatment, the position of the oil bath was always controlled so as to make the liquid depth of heating medium 145 mm. The outside wall surface temperature of the vapor phase portion and vapor-liquid interface portion was 160° C.

The separable flask used for the reaction was not washed, and applied as intact to the next one batch of similar procedures. As a result, 0.38 g of scale was adhered.

Comparative Example 3

A 2000 ml separable flask equipped with a condenser, stirrer and temperature sensor was charged 861 g (9.15 moles) of phenol, 30.0 g of methanol and 0.889 g of diethyl sulfate. The resultant mixture was heated with stirring in an oil bath. At the point in time, the liquid depth of reaction mass was 70 mm. Charge of PXDM was initiated when the temperature of the reaction mass reached to 140° C. PXDM was continuously added over 4 hours. Charged PXDM was 831 g (5.0 moles). During the addition of PXDM, the outside of wall surface temperature of the vapor phase portion and vapor-liquid interface portion was 150° C.

The temperature of the reaction mass was further raised to 160° C., an aging reaction was carried out for 90 minutes and unreacted phenol was successively removed under reduced pressure to obtain 1010 g of phenol aralkyl resin. At the point in time, the liquid depth of the reaction mass was about 67 mm and the temperature of the outside wall surface of vapor phase portion and vapor-liquid interface portion was 160° C.

During the reaction and post treatment, the position of the oil bath was always controlled so as to make the liquid depth of the heating medium 145 mm.

The separable flask used for the reaction was not washed, and applied as intact to the next one batch of similar procedures. As a result, 0.45 g of scale was adhered.

The results of Examples 1, 2, 3 and 4 were summarized in Table 1, Examples 5, 6, 7 and 8 were summarized in Table 2 and Example 9 and Comparative Example 1, 2 and 3 were summarized in Table 3.

TABLE 1

|  | Example 1 | Example 2 | Example 3 | Example 4 |
| --- | --- | --- | --- | --- |
| Phenol compound | phenol | phenol | phenol | phenol |
| Aralkyl comound | PXDC | PXDC | PXDC | PXDC |
| Temperature of outside wall surface in vapor phase portion and vapor-liquid interface portion (° C.) | 60 | 110 | 150 | 150 |
| Reaction mass temperature (° C.) | 90–150 | 130–150 | 160 | 160 |
| Nitrogen flow (Oxgen concentration of vapor phase) (vol %) | not ventilated | not ventilated | not ventilated | ventilated (0.5) |
| Liquid depth ratio(*) | 0.496–0.878 | 0.496–0.878 | 1.0 | 1.0 |
| Repeated number of batch | 5 | 10 | 10 | 10 |
| Scale adhesion (g) | not observed | not observed | not observed | very small amount(**) |

(*)Ratio of liquid ratio of heating medium to liquid depth of reaction mass
(**)A very small amount of scale was observed. There was no difference in weight of sparable flask between and after reaction.

TABLE 2

|  | Example 5 | Example 6 | Example 7 | Example 8 |
|---|---|---|---|---|
| Phenol compound | phenol | phenol | phenol | phenol |
| Aralkyl comound | PXDM | PXDC | PXDC | PXDC |
| Temperature of outside wall surface in vapor phase portion and vapor-liquid interface portion (° C.) | 130 | 100–120 | 100–120 | 60 |
| Reaction mass temperature (° C.) | 140–160 | 130–160 | 130–160 | 90–150 |
| Nitrogen flow (Oxgen concentration of vapor phase) (vol %) | not ventilated | ventilated (2.0) | ventilated (2.0) | not ventilated |
| Liquid depth ratio(*) | 0.857–0.860 | 0.870–0.926 | 0.649–0.667 | 0.305–0.540 |
| Repeated number of batch | 5 | 10 | 10 | 5 |
| Scale adhesion (g) | not observed | not observed | not observed | not observed |

(*)Ratio of liquid depth of heating medium to liquid depth of reaction mass

TABLE 3

|  | Example 9 | Comparative Example 1 | Comparative Example 2 | Comparative Example 3 |
|---|---|---|---|---|
| Phenol compound | phenol | phenol | phenol | phenol |
| Aralkyl comound | BCBP | PXDC | PXDC | PXDC |
| Temperature of outside wall surface in vapor phase portion and vapor-liquid interface portion (° C.) | 60 | 160 | 160 | 150–160 |
| Reaction mass temperature (° C.) | 110–150 | 160 | 160 | 140–160 |
| Nitrogen flow (Oxgen concentration of vapor phase) (vol %) | not ventilated | not ventilated | ventilated (0.5) | not ventilated |
| Liquid depth ratio(*) | 0.403–0.627 | 1.11–1.96 | 1.11–1.96 | 2.07–2.16 |
| Repeated number of batch | 5 | 2 | 2 | 2 |
| Scale adhesion (g)(**) | not observed | observed (0.52) | observed (0.38) | observed (0.45) |

(*)Ratio of liquid depth of heating medium to liquid depth of reaction mass
(**)Weight of scale was calculated from the difference in weight of separable flask between before and after reaction.

Next, the phenol aralkyl resin thus obtained was applied to preparation of molding materials and solder heat resistance was evaluated.

Example 10

At room temperature, 12 parts by weight of biphenyl based epoxy compound; YX4000 (trademark, manufactured by Yuka Shell Epoxy Co.), 8 parts by weight of phenol aralkyl resin obtained in Example 1 as a curing agent, 0.2 part by weight of triphenylphosphine as a curing accelerator, 78.8 parts by weight of molten silica powder, 0.5 part by weight of carbon black, and 0.5 part by weight of Carnauba wax were blended with a mixer. The mixture thus obtained was kneaded at 70 to 100° C. with a biaxial roll, cooled, ground and used as a molding material. The molding material thus obtained was tabletted and molded with a low pressure transfer molding machine at 175° C. under increased pressure of 70 kg/cm$^2$ for 120 seconds to prepare a square chip having a side of 6 mm. The square chip thus obtained was sealed into a 52-pin package in order to carry out a solder crack test. The sealed element to be tested was treated at 85° C. in an environment of 85% RH for 72 hours, and successively submerged into a solder bath at 260° C. for 10 seconds. The test was carried out on 8 test elements.

After finishing the test, the presence or absence of external cracks was observed under microscope. As a result, the external crack was not found on any pieces of 8 specimens. Thus, solder heat resistance of these test elements was good.

Comparative Example 4

Test elements prepared by the same procedures as Example 10 except that the phenol aralkyl resin obtained in Comparative Example 1 was used. The solder heat resistance was evaluated by the same procedures as Example 10. As a result, external cracks were observed on 7 specimens in the overall 8 specimens. Thus, solder heat resistance of these specimens was poor.

What is claimed is:

1. A preparation process of phenol aralkyl resin from a phenol compound and an aralkyl compound in manufacturing equipment having a wall surface contacting a reaction mass and an outside wall surface, said process comprising controlling the temperature of the reaction mass in the range of 70 to 240° C., simultaneously controlling the temperature of a vapor phase portion and a vapor-liquid interface portion of the manufacturing equipment so as to keep the wall surface of the vapor phase portion and vapor-liquid interface portion in a wet state and controlling the outside wall surface temperature of the vapor phase portion and the vapor-liquid interface portion to a range which is 5 to 90° C. lower than the temperature of the reaction mass wherein the ratio of liquid depth of a heating medium in a jacket to the liquid depth of the reaction mass is in the range of 0.3 to 1.

2. The preparation process of phenol aralkyl resin according to claim 1, comprising using manufacturing equipment having a jacket vertically divided into two sections, controlling the temperature of the reaction mass by the lower jacket and controlling the outside wall surface temperature of the vapor phase portion and vapor-liquid interface portion by the upper jacket.

3. The preparation process of phenol aralkyl resin according to claim 1, comprising the vapor phase portion being substituted or ventilated with an inert gas.

4. The preparation process of phenol aralkyl resin according to claim 1, wherein the phenol compound is one or more compounds selected from the group consisting of phenol, p-cresol, xylenol, p-tert-butylphenol, p-phenylphenol, catechol, resorcinol and naphthol.

5. The preparation process of phenol aralkyl resin according to claim 4, wherein the phenol compound is phenol.

6. The preparation process of phenol aralkyl resin according to claim 1, wherein the aralkyl compound is one or more compound selected from the group consisting of a bis(halomethyl)aromatic compound, bis(hydroxymethyl) aromatic compound and bis(alkoxymethyl)aromatic compound.

7. The preparation process of phenol aralkyl resin according to claim 6, the bis(halomethyl)aromatic compound is 1,4-bis(chloromethyl)benzene.

8. The preparation process of phenol aralkyl resin according to claim 6, the bis(alkoxymethyl)aromatic compound is 1,4-bis(methoxymethyl)benzene.

* * * * *